J. R. GATES.
CIDER AND WINE MILL.

No. 33,581.  Patented Oct. 29, 1861

UNITED STATES PATENT OFFICE.

JOSEPH R. GATES, OF LOUISVILLE, KENTUCKY.

IMPROVEMENT IN CIDER AND WINE MILLS.

Specification forming part of Letters Patent No. 33,581, dated October 29, 1861.

*To all whom it may concern:*

Be it known that I, JOSEPH R. GATES, of Louisville, in the county of Jefferson and State of Kentucky, have invented a new and Improved Cider and Wine Mill; and I do hereby declare that the following is a full, clear, and exact description of the same, reference being had to the accompanying drawings, making a part of this specification, in which—

Figure 1:
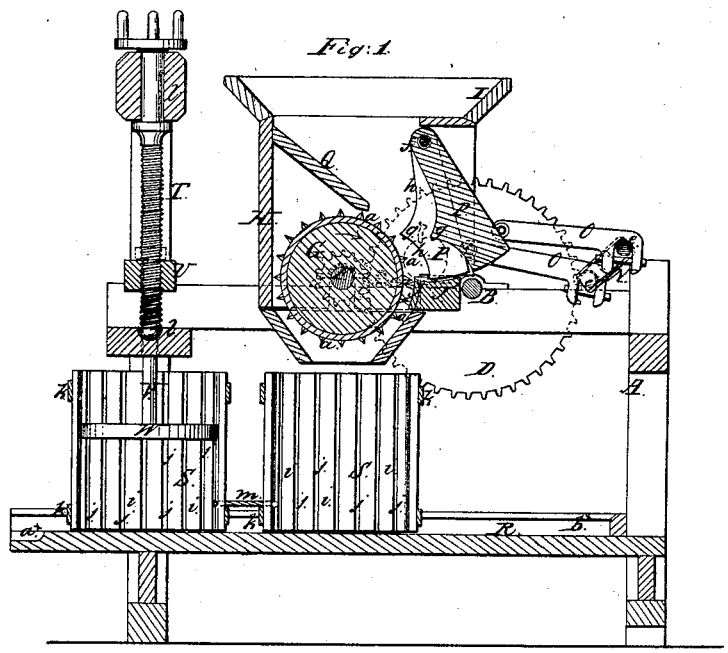
Figure 2:
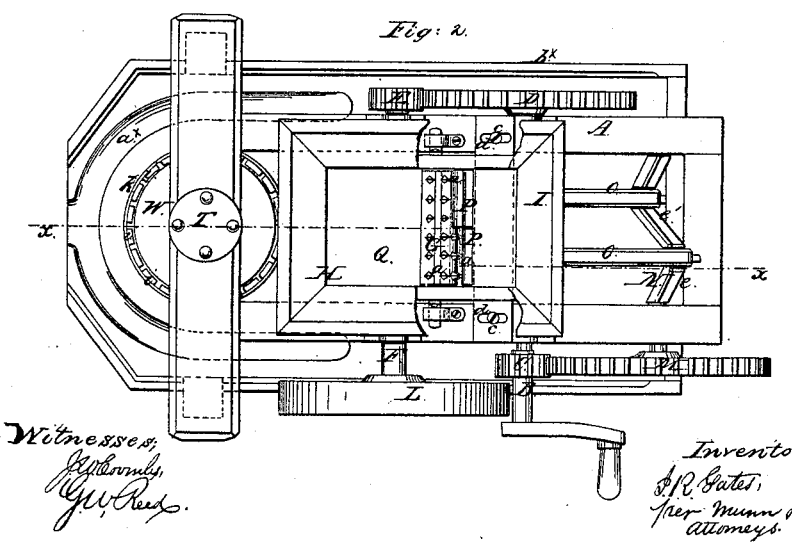

Figure 1 is a side sectional view of my invention, taken in the line $x\,x$, Fig. 2. Fig. 2 is a plan or top view of the same partly in section.

Similar letters of reference indicate corresponding parts in the two figures.

The object of this invention is to obtain a mill for grinding or crushing apples and other fruit for the manufacture of cider, wine, &c., in a more efficient manner than hitherto, and to this end I use, in connection with a rotating toothed cylinder, one or more vibrating or swinging crushers constructed and arranged to operate substantially as hereinafter shown and described.

The invention also has for its object the combining of a screw-press with the crushing device in such a way as to greatly facilitate the expressing of the juice from the pomace.

To enable those skilled in the art to fully understand and construct my invention, I will proceed to describe it.

A represents a framing, which may be constructed in any proper way to support the working parts of the machine, and B is a driving-shaft, which is placed on the framing A, and has a pinion C at one end and a toothed wheel D at the other end. The wheel D gears into a pinion E, which is on the shaft F of a cylinder G, the periphery of which is provided with teeth $a$, as shown in both figures. The cylinder G is inclosed within a box H, which has a hopper I on its upper end.

J is a concave, which is placed within the box H at its front part and just below the plane, which touches the center of the shaft F of the cylinder G. The concave J is toothed at its face side and it is attached to a bar J', which is secured to the framing A by setscrews $c$, said set-screws passing through oblong slats $d$ in the ends of the bar J', which admit of the concave J being adjusted nearer to or farther from the cylinder G, as may be desired. This will be fully understood by referring to Fig. 2. The shaft F of the cylinder G has a fly-wheel L on it near the end opposite to that where the pinion E is attached.

The pinion C of the driving-shaft B gears into a toothed wheel M, which is on one end of a crank-shaft N. This shaft has its bearings on the tops of the framing A, and is provided with two cranks $e\,e'$, which have reverse positions, and each of which is provided with a connecting-rod O.

Within the box H there are suspended two bars P P side by side. These bars are allowed to swing loosely on a common shaft $f$, and they are connected to the rods O O. The inner or face sides of the bars P P are each provided with a projection $g$, said projections being formed by concaves $h\,h$, as shown clearly in Fig. 1. The bars P P are directly above the concave J and in front of the toothed cylinder G, the projections $g$ being considerably above the horizontal plane in which the shaft F of the cylinder G is placed.

Q is an inclined board, which is placed in the box H and over the toothed cylinder G. This board serves as a chute or guide for the fruit to be crushed, and directs the latter to the front of the cylinder between it and the bars P P, as will be fully understood by referring to Fig. 1.

In the lower part of the framing A there is a platform R, on which the fruit-receptacles S S are placed. These fruit-receptacles may be constructed in the usual way—to wit, of upright slats $i$, with spaces $j$ allowed between for the escape of the juice, the slats being secured to the hooks $k$.

At one end of the framing A there is a screw T. This screw is fitted vertically in the framing A in proper bearings $l\,l$, as shown in Fig. 1, and said screw passes through a cross-head U. There is placed a vertical slide V, to the lower ends of which a plunger W is placed, which is made to fit the fruit-receptacles S S. (See Fig. 1.) The shaft B is rotated by any convenient power, and the fruit to be crushed is placed in the box H and passes down the inclined board Q, between the cylinder G, bars P P, and concave J. The fruit is crushed chiefly between the cylinder and concave, and the bars P P, which have a vibrating movement communicated to them by the cranks *e e'* and connecting-rods O O, serve on account of the projections *g g* to retain or hold down the fruit while being crushed between the cylinder and concave. This will be readily understood by referring to Fig. 1, in which the projections of the bars P P are clearly shown. The ordinary mills for the same purpose have not, so far as I am aware, any device for preventing the upward movement of the fruit in the cylinder-box while being acted upon by the grinding or crushing apparatus, and hence the ordinary mills are far less efficient than they would otherwise be. The bars P P also serve as crushers to a certain extent, as they are pressed toward the cylinder G, and thereby greatly facilitate the subsequent and chief crushing operation performed by the cylinder and concave. The projections *g* of the bars P P also serve to protect the fruit below them, and which is being subjected to the crushing operation from the superincumbent weight of the fruit alone, and hence the work is performed in a much more thorough manner than usual.

The crushed fruit falls into the receptacle S below it, and when one receptacle is filled it is placed under the screw T, while its fellow is adjusted beneath the box H. The juice is expressed from the crushed fruit by forcing down the plunger W through the medium of the screw T. This arrangement greatly facilitates the expressing of the juice from the pomace, as one receptacle is being filled with pomace while the other is having the juice expressed from its contents, and in consequence of having the receptacles connected together they may be readily adjusted in proper position. The juice is discharged from one end of the platform R, the latter having a shallow trough or gutter $a^\times$ formed in it to receive the juice and facilitate its discharge. The platform may be slightly inclined, and it has a ledge or guard $b^\times$ around it to prevent the escape of the juice at its sides and back end.

Having thus described my invention, what I claim as new, and desire to secure by Letters Patent, is—

1. The employment or use of the vibrating, crushing, and fruit-retaining bars P P (one or more) in connection with the cylinder G and concave J, or their equivalents, all arranged to operate substantially as and for the purpose set forth.

2. The arrangement of the crank-shaft M, connecting rods O O with the gearing C D E M, and shafts B F, substantially as shown, for operating simultaneously, and from one and the same driving-shaft B, the rotating cylinder G, and vibrating bars P P.

3. In combination with the vibrating, crushing, and fruit-retaining bars P P, cylinder G, and concave J, the inclined guide-board Q, arranged in relation with the cylinder, bars, and concave to direct or guide the fruit properly between the cylinder and concave, as set forth.

4. The two fruit or pomace receptacles S S, placed upon a platform R when said receptacles and platform are used in connection with a screw T, and plunger W, and also with a crushing device, formed of the cylinder G, concave J, and vibrating bars P P.

JOSEPH R. GATES.

Witnesses:
 JOS. CLEMENT,
 I. L. BROM.